United States Patent [19]

Lange

BEST AVAILABLE COPY

[11] E Re. 29,054

[45] Reissued Nov. 30, 1976

[54] APPARATUS FOR ATTACHING A HOT AND COLD WATER PLUMBING FIXTURE TO BUILDING WATER PIPES

[76] Inventor: Hermann Paul Lange, Singlistrasse 15, 8049 Zurich, Switzerland

[22] Filed: Apr. 17, 1975

[21] Appl. No.: 568,818

Related U.S. Patent Documents

Reissue of:

[64] Patent No.: 3,856,334
Issued: Dec. 24, 1974
Appl. No.: 201,848
Filed: Nov. 24, 1971

[30] Foreign Application Priority Data

Dec. 2, 1970 Austria ..... 10849/70

[52] U.S. Cl. ..... 285/137 R; 4/192; 137/360; 285/158; 285/169; 285/302; 285/382.7

[51] Int. Cl.[2] ..... F16L 39/04

[58] Field of Search ..... 285/137 R, 137 A, 64, 285/169, 302, 158, 382.7; 4/192, DIG. 7, 191, 148; 137/360, 359

[56] References Cited

UNITED STATES PATENTS

| | | | |
|---|---|---|---|
| 1,231,928 | 7/1917 | Miller et al. | 285/137 R X |
| 1,911,285 | 5/1933 | O'Brien | 137/359 |
| 2,233,267 | 2/1941 | McGarry | 137/360 |
| 2,314,408 | 3/1943 | Knight | 285/137 R X |
| 2,876,023 | 3/1959 | Ford | 285/137 R |
| 3,011,520 | 12/1961 | Barkelew | 137/359 X |
| 3,041,090 | 6/1962 | Ashe et al. | 285/137 R |
| 3,282,612 | 11/1966 | Younger | 285/137 R |
| 3,476,869 | 11/1969 | Hawkins | 285/137 R X |

FOREIGN PATENTS OR APPLICATIONS

| | | | |
|---|---|---|---|
| 1,255,041 | 1/1961 | France | 4/192 |
| 1,809,022 | 6/1970 | Germany | 4/192 |

*Primary Examiner*—Thomas F. Callaghan
*Attorney, Agent, or Firm*—Pennie & Edmonds

[57] ABSTRACT

A hot and cold water plumbing fixture having a pair of water supply lines arranged parallel to each other in a fixture housing is attached to building water pipes by means of a wall fitting which includes a pair of connecting pipes disposed parallel to each other adjacent one end, and extending at a substantial angle to each other at the opposite end. The parallel end portions of such connecting pipes are of such size and spacing that they may telescope with the supply lines of the plumbing fixture. The opposite ends of the connecting pipes are attached to the building water pipes, preferably by means of a compression coupling which allows for considerable axial tolerance between the building water pipes and the pipes of the wall fitting. The plumbing fixture is attached to the wall fitting by simply telescoping the water supply lines of the fixture with the connecting pipes of the fitting, and by then locking the fixture to the fitting by means of a locking screw or other device. Sealing means are provided to make water-tight the telescoped joints between the fixture supply lines and the connecting pipes of the wall fitting.

7 Claims, 6 Drawing Figures

INVENTOR.
Hermann Paul Lange
BY Pennie, Edmonds, Morton, Taylor & Adams
ATTORNEYS INVENTOR.
Hermann Paul Lange
BY Pennie, Edmonds, Morton, Taylor & Adams
ATTORNEYS.

INVENTOR.
Hermann Paul Lange
BY Pennie, Edmonds, Morton, Taylor & Adams
ATTORNEYS INVENTOR.
Hermann Paul Lange
BY Pennie, Edmonds, Morton, Taylor & Adams
ATTORNEYS INVENTOR.
Hermann Paul Lange
BY Pennie, Edmonds, Morton, Taylor & Adams
ATTORNEYS

APPARATUS FOR ATTACHING A HOT AND COLD WATER PLUMBING FIXTURE TO BUILDING WATER PIPES

Matter enclosed in heavy brackets [ ] appears in the original patent but forms no part of this reissue specification; matter printed in italics indicates the additions made by reissue.

FIELD OF THE INVENTION

The invention relates to a slip-on connection for locking installation of a combined hot and cold water plumbing fixture on a wall fitting which in turn is connected to hot and cold water pipes installed in a building.

In known connections of this kind, the pipes for hot and cold water supply are so laid in the wall of the building that after plastering or tiling, the fixtures can be connected to the lines inside the wall by screw connections. For this purpose, the building pipes must be cut just to the required length, carefully aligned, and threaded. The building pipes are connected to the fixture by a second operation, generally with screw connections and unions. This work, however, is extremely time consuming, since extensive fitting operations are commonly required. Since the two screw connections must be at just the same distance from the wall surface, the pipe is not cut to length until final installation, since at the time when the pipe is being laid the wall surface is unfinished and its specified dimensions ordinarily will not be accurately maintained. The same applies to the distance between and parallelism of the two pipes projecting from the wall, where deviation from specifications often leads to considerable difficulties in the installation of the fixture.

SUMMARY OF THE INVENTION

The object of the invention is to provide a connection permitting a simple, standardized and time saving operation of mounting the fixture on the wall. This object is achieved according to the invention by the provisions of a wall fitting such that the pipe ends leaving the wall and the fixture lines are capable of being telescoped one into another, with concentric packings provided between the pipes so connected, and in that locking means such as at least one locking screw mounted in the fixture and passing through a space between the pipe ends are provided, so that the wall fitting pipes can be locked together with the fixture, thereby providing a positive mechanical fastening of the fixture at an arbitrary depth of insertion, within preassigned tolerances, relative to the wall fitting.

In this way it is possible to mount the fixture snugly, that is, with no clearance, against the final wall surface, and even if the thickness of the wall is changed later, for example by installation of tiles, the fixture can be adjusted to the new thickness by loosening and tightening a screw.

Thus, the invention provides improved apparatus for attaching a hot and cold water plumbing fixture to hot and cold water pipes installed in a building, said fixture having a housing enclosing a pair of spaced water supply lines disposed substantially parallel to each other. Such apparatus comprises a wall fitting including a pair of connecting pipes disposed parallel to each other adjacent one end and adapted to be connected respectively to the building hot and cold water pipes at their opposite ends. The parallel portions of said connecting pipes are of such size and spacing as to receive and telescope with the spaced parallel fixture supply lines. Sealing means are provided for making water-tight the joint between said connecting pipes and fixture supply lines when they are telescoped together, and means also are provided for mechanically locking said fixture housing and said wall fitting together when said connecting pipes and supply lines are in telescoped engagement.

According to a refinement of the invention the fixture housing has at least two supporting ribs for each pipe end, running parallel to the latter. In further accordance with this refinement, the locking screw is capable of being tightened against each pipe on the other side of the fixture from the supporting ribs, so that the forces acting on the pipes will line up the fixture exactly parallel to the wall fitting. This eliminates any tilting during installation such as will occur in the case of known connections, leading at best to loss of time at installation and at worst to damage to the fixture or to the wall fitting.

It is advantageous according to [a] *the* refinement of the invention for *the* two parallel supporting ribs to be provided in the fixture, with an angle of about 120° between them with respect to the pipe cross section, and that a third support, more or less with point contact, at about the same angle from each of the other two supports, be formed by the head of the locking screw. Then each pipe is positvely aligned on two supporting ribs parallel to each other, as if on rails. The head of the locking screw forms a purchase with point contact, pressing the pipe against the rails. Thanks to this exact parallelism, the fixture can be slipped in place with great ease, thus shortening the installation time. Upon tightening, finally, an approximately equilateral triangle of forces exerts an optimal distribution of pressure on the pipe, achieving a highly effective fixation.

According to a *further* refinement of the invention an opening is provided in the bottom of the fixture housing for inserting and turning the locking screw, which may engage a threaded boss provided on the upper inside wall where it is concealed from the outside. The result is that the fixture can be built plain and continuous on top all the way to the wall surface. The separate surrounds or trims commonly used are eliminated. Another result is that a simple casting may form the fixture housing. Only on the under side, where water and dirt cannot enter, is the opening for the concealed locking screw provided. The locking screw itself need not protrude. but may be practically flush with the opening provided in the wall of the fixture.

Advantageously, the threaded boss itself may take the form of a supporting rib for the two pipes in contact with it on opposed sides. This construction provides a simplification of design whereby the casting mold for the fixture housing may be kept especially simple.

Another refinement of the invention provides that at least one of the supporting ribs along a pipe should be formed with a sharp edge for engagement with the connecting pipe of the wall fitting. In this way, any slight tilting of the fixture relative to the wall fitting that might occur due to relative rotation of connecting pipe and fixture during tightening is avoided. In other words, the parallel guidance is maintained during the locking operation as well. [ Means ]

A *still further* refinement of the apparatus of the invention consists in that a spectacle-shaped plate formed with a pair of apertures through which the fixture supply lines extend is provided inside the fixture housing, which plate is capable of being pressed against wedge rings for seal and mechanical fixation of the fixture. The spectacle-shaped plate guides the two pipes of the wall fitting parallel to each other, and these pipes find their second point of guidance in the open ends of the fixture supply lines. [means] *Means* bearing on the spectacle-shaped plate are provided to press it and the wedge rings toward the ends of the fixture supply lines, whereby when the supply lines and connecting pipes are telescoped said wedge rings may be forced into sealing engagement with the ends of the fixture supply lines. The means bearing on the spectacle-shaped plate advantageously is an eccentric screw forming a rotatable cam the surface of which bears against said plate in position to move it axially with respect to the fixture supply lines. Thus the force exerted by the eccentric locking screw is transmitted uniformly to the locking rings.

It is especially advantageous for the locking rings to be wedge-shaped and engaged between the pipe ends and the fixture lines, so that the two can be locked together in a tight and positive connection when an eccentric screw or cam is provided to clamp the spectacle-shaped plate, such locking means can be actuated from the under side of the fixture, and practically no dirt or water can get into the fixture from the outside. The eccentric screw or cam advantageously is arranged parallel to the plane of the spectacle-shaped plate, and is eccentric at least over most of that portion of its length where it bears on such plate. As a result of this, force is transmitted with complete uniformity from the screw to the spectacle-shaped plate, maintaining and assisting the parallel guidance of said plate.

It is likwise advantageous if the connecting pipes of the wall fitting are held together by holding means in which their parallel end portions are rotatable about their centerlines, along which they telescope with the fixture supply lines. The great advantage of angular adjustability of the connecting pipes, by a rotation relative to the fixture, consists in that the building water pipes inside the wall may extend toward the wall fitting at any convenient angle. The holding means may be fixed to the wall.

To accommodate differences in distance between the wall fitting and the building pipes, a compression coupling may advantageously be used to join them, permitting considerable axial tolerance between the ends of the connecting pipe-ends and the building piping system.

Finally, to seal the telescoped connecting pipes and fixture supply lines, compressible packing washers may be held between flared ends of the supply lines and compression sleeves surrounding such lines. An eccentric screw or cam mounted on the fixture housing may be provided for adjusting a spectacle-shaped plate by which the compression sleeves may be moved axially to compress the packing washer and expand them into sealing engagement with the connecting pipes of the wall fitting.

DESCRIPTION OF THE DRAWINGS

In the following, embodiments of the invention will be described in some detail, by way of example, with reference to the accompanying drawings, in which.

DESCRIPTION OF EMBODIMENTS OF THE INVENTION

Figure 1:
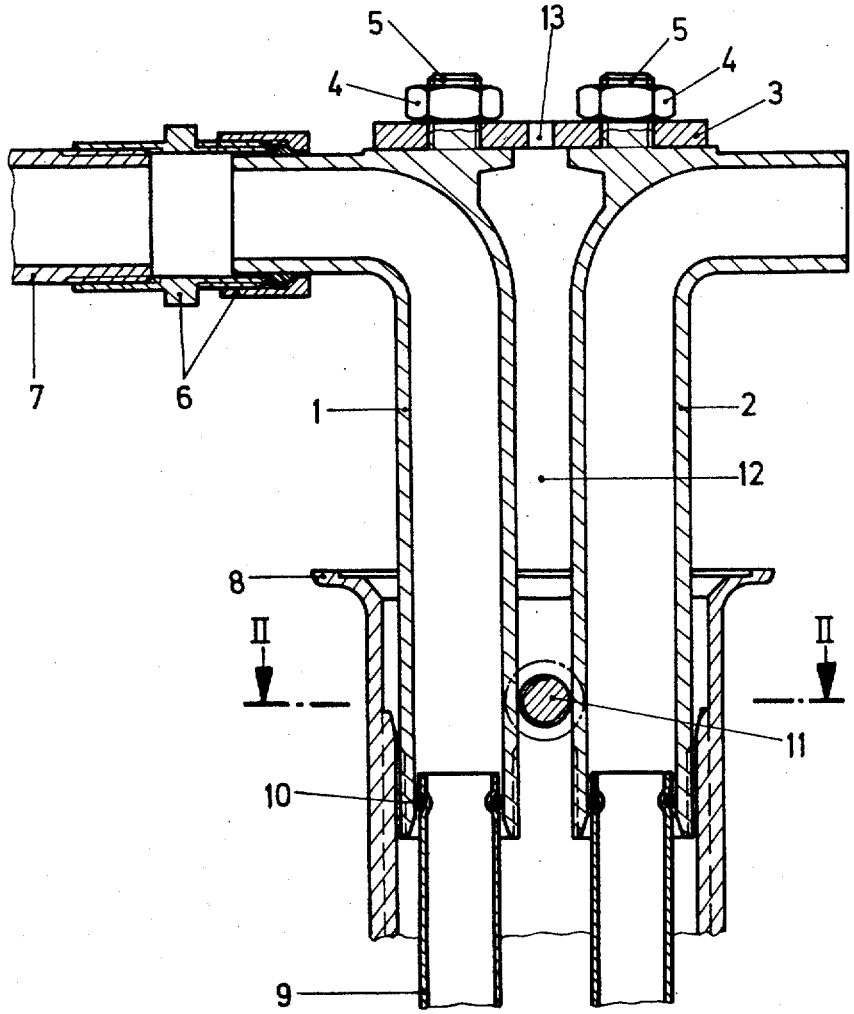
FIG. 1 shows a section of a wall fitting with parts of a fixture connected thereto.

The arrangement of FIG. 1 consists of a wall fitting having two connecting pipes 1 and 2 fastened to a common plate 3. In the example, the fastening is provided by means of two nuts 4 and a threaded stud 5 on each of the connecting pipes 1 and 2. A compression fitting 6 of known type provides for attachment to a building water supply line 7.

The pipes 1 and 2 are axially rotatable on the plate 3 about the centerlines of their parallel end portion. The wall fitting comprising the pipes and the plate is fastened to the wall by means of a centering and attachment hole provided in plate 3. By simply pivoting them on the threaded studs 5, pipes 1 and 2 can be accurately aligned with building pipes 7 leading to the wall fitting at any angle. Yet the spacing of the parallel portions of pipes 1 and 2 remains constant in the region of their connection to the fixture. The compression fitting connection 6 permits compensation of length discrepancies from the supply pipes 7, due to inaccurate cutting or assembly tolerances.

In a fixture housing 8, fixture supply lines 9 are mounted so as to extend concentrically with pipes 1 and 2 and be telescoped into pipes 1 and 2. The telescoped connection is sealed by packing rings 10.

In the fixture housing, a locking screw 11 is provided, passing through a space 12 between pipes 1 and 2. As the fixture is slipped on, the screw 11 can slide along in the space 12. After the wall has been plastered or tiled, the fixture is slipped onto the wall fitting and finally secured in place by drawing up the locking screw 11. Owing to the predetermined standardized spacing from each other of the two connecting pipes 1 and 2 of the wall fitting, and the ease of sliding the fixture axially along the pipes, this mounting operation is very simple and time saving.

Figure 2:
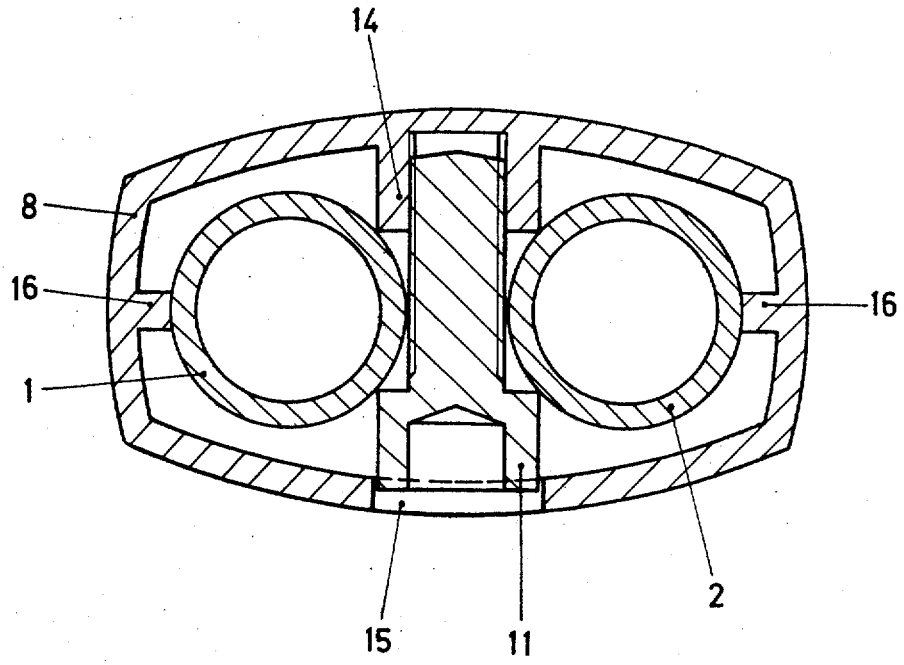
FIG. 2 shows a section at II—II in FIG. 1.

FIG. 2, representing a section at II—II in FIG. 1, shows in detail how the locking action is brought about by means of screw 11. Inside the fixture housing 8 at the top, an internally threaded boss 14 is provided, engaged by the locking screw 11. The boss has two sharp edges parallel to the centerlines of the pipes. These edges of the boss 14 engage with pipes 1 and 2 and prevent relative rotation of connecting pipes and housing when the locking screw is tightened. A second supporting edge is provided by the head of the locking screw 11. Finally, the fixture housing 8 has a supporting rib 16 in the center of the interior of each side. Thus each pipe 1 and 2 is guided parallel first by two supports each, 14 and 16, in the manner of rails, and also is pressed against the rails by the head of the locking screw 11. The screw can be inserted and screwed or unscrewed through an opening 15 in the bottom of the fixture housing 8. Each pipe is thus wedged in triangularly. Preferably, the lines of support are about 120° apart. Then pipes 1 and 2 are locked in place by an approximately equilateral triangle of forces.

Figure 3:
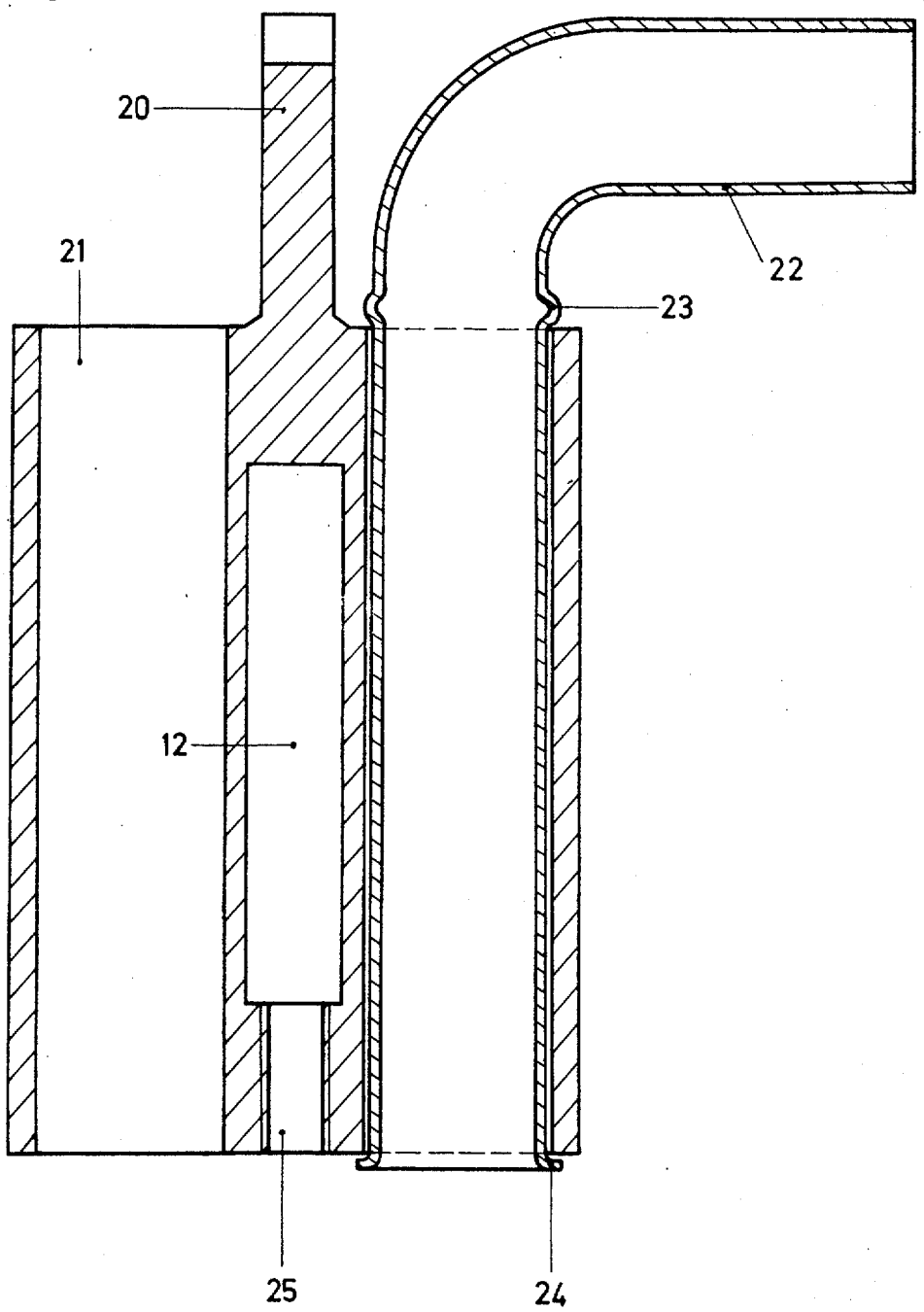
FIG. 3 shows a sectional view of another embodiment.

In the second embodiment of the wall fitting, represented by way of example in FIG. 3, the plate 3 of FIG. 1 is replaced by a guide fitting 20. This fitting, to be set in the wall, has two parallel passages 21, each accepting an end portion of a connecting pipe 22. Such end portion of the connecting pipe is freely rotatable in its concentric passage 21, and is beaded at 23 and 24 at the ends of the passage so that it cannot slip out of the guide fitting. In the wall region, the connecting pipe 22 is bent at approximately a right angle from the portion mounted in the guide fitting. By rotating the supply pipe 22 in the guide fitting, the bent end can easily be aligned with a supply line 7 laid in the wall at any angle. The connection is made by means of a compression fitting 6 as in FIG. 1.

The guide fitting 20 may be a metal casting, or alternatively may be made of synthetic materials. In the region between the passages, a space 12 is provided in the form of an oblong hole. The front end of the guide fitting 20 is provided with a threaded hole 25 into which a screw is threaded to press a coverplate with packings over the pipe openings in conventional manner, so that the supply network installation can be hydraulically tested without installation of the fixture.

Figure 4:
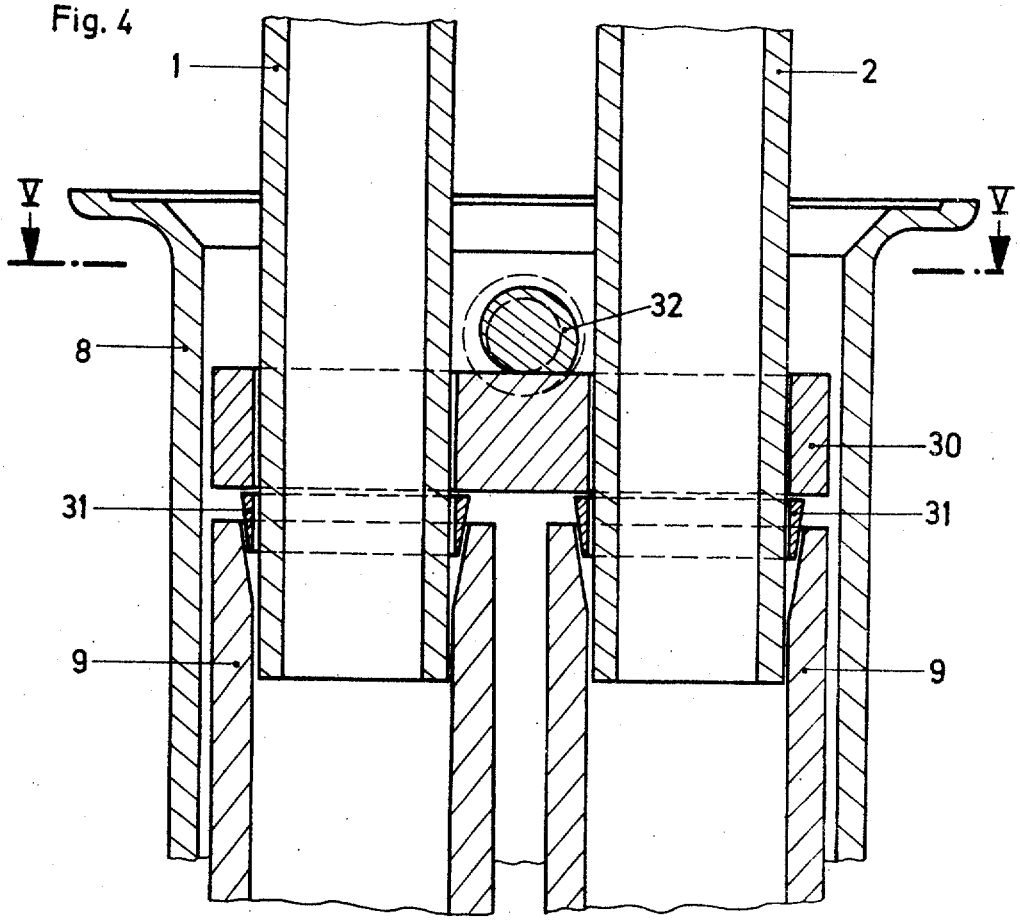
FIG. 4 shows a section of a fixture connection according to still another embodiment.
Figure 5:
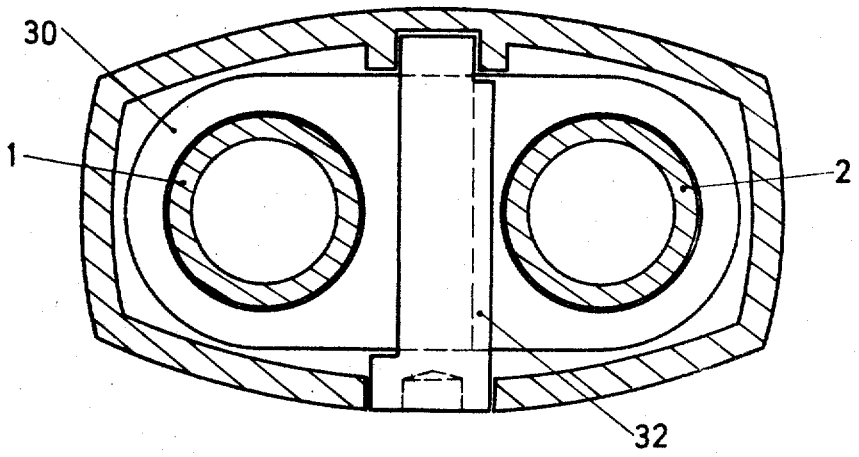
FIG. 5 shows section V—V in FIG. 4.

According to another embodiment, represented by way of example in FIGS. 4 and 5, a modified method of securing the fixture to the wall fitting is illustrated. On the two parallel pipes 1 and 2, there is provided a spectacle-shaped plate 30 formed with a pair of spaced apertures through which extend the connecting pipes 1 and 2 of the wall fitting. A locking ring 31 is slipped onto each pipe 1 and 2. Contrary to the embodiments previously illustrated, pipes 1 and 2 are inserted into the fixture supply lines 9, as shown in FIG. 4, instead of vice versa. With the aid of an eccentric cam 32 formed on a locking screw 11 and extending across the plate 30, the spectacle-shaped plate 30 forces the locking rings 31 between connecting pipes 1, 2 and the fixture lines 9 to form a seal.

In FIG. 5, the construction of the spectacle-shaped plate 30 and locking screw 11 with eccentric cam 32 is shown in plan view. It will be seen that the spectacle-shaped plate 30 is slidably arranged on pipes 1 and 2 so that the locking rings 31 can easily be pressed into their final position.

Figure 6:
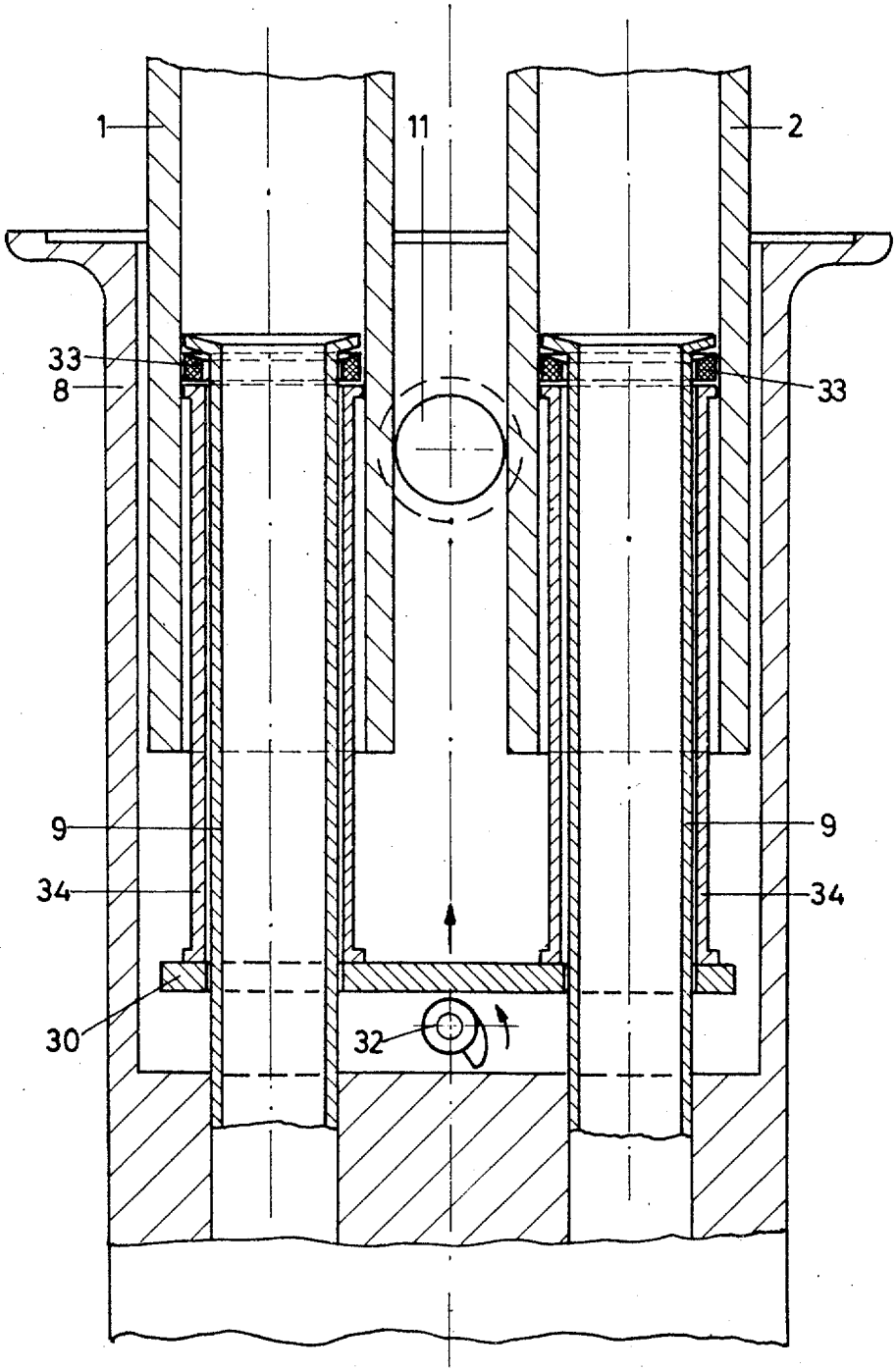
FIG. 6 shows a sectional view of yet another embodiment.

In a modification of the last embodiment, a compressible packing is provided between the telescoped pipes in the example shown in FIG. 6. As in the first example of FIG. 1, the fixture lines 9 lie concentrically within the connecting pipes 1 and 2 of the wall fitting. The lines 9 are flared at the anterior ends to retain a compressible packing 33, for example a rubber packing ring, from slipping off. The other side of the packing is acted upon by a compression sleeve 34 arranged to be axially displaceable along the outer surface of the fixture line 9. The compression sleeve bears against a spectacle-shaped plate 30. When the spectacle-shaped plate is forced forward by means of an eccentric cam screw 32 mounted in the fixture housing 8, the compression sleeves are moved forward relative to the fixture lines 9. This compresses the packing 33 and provides the desired seal between lines 9 and the connecting pipes 1 and 2. A locking screw 11, as in the first embodiment described, serves for mechanical fixation of the fixture to the wall fitting.

It should be mentioned that the wall fitting may alternatively be made in one piece, for example as an integral casting, in which case it is no longer possible to rotate the outwardly bent ends of the connecting pipes 1 and 2 inside the wall. Of course it is possible to provide pivotable elbows with such a construction, to permit angular adjustment of the connection to the building piping 7 inside the wall.

I claim:

1. Apparatus for attaching a hot and cold water plumbing fixture having a housing enclosing a pair of spaced water supply lines disposed substantially parallel to each other to hot and cold water pipes installed in a building, said apparatus comprising a wall fitting including a pair of connecting pipes which are arranged parallel to each other adjacent one end and adapted to be connected respectively to the building water pipes at their opposite ends, said opposite ends of said pipes extending at a substantial angle one to the other, the parallel portions of said connecting pipes being of such size and spacing as to receive and telescope with the spaced parallel fixture water supply lines, means holding said connecting pipes together with the parallel end portions spaced a fixed distance apart and permitting rotation of said connecting pipes about an axis through said parallel end portions in order to change the disposition of said opposite ends, said means for holding and permitting rotation includes a plate coextensive with a portion of the length of said connecting pipes at said opposite ends, said plate providing a pair of spaced apertures, each of said connecting pipes at said opposite end having a surface complementary to for receipt in juxtaposition on said plate, a stud projecting from each surface for receipt through each said apertures, means received by each said stud for fastening said connecting pipes to said plate, sealing means for making water-tight the joint between said connecting pipes and fixture supply lines when they are telescoped together, and means for mechanically locking said fixture housing and said wall fitting together when said connecting pipes and supply lines are in telescoped engagement.

2. Apparatus according to claim 1, characterized in that the opposite ends of each connecting pipe telescopes into a compression fitting by which such pipe may be attached with considerable axial tolerance to the building water pipes.

*3. Apparatus for attaching a hot and cold water plumbing fixture to hot and cold water pipes installed in a building, said plumbing fixture having a housing enclosing a pair of spaced water supply lines disposed substantially parallel to each other, comprising wall fitting means including a pair of connecting pipes, said wall fitting means supporting said connecting pipes in a manner such that they are disposed parallel to each other adjacent one end and adapted to be connected respectively to the building water pipes at their opposite ends, the parallel portions of said connecting pipes being of a size and at a spaced disposition to telescopically engage with said water supply lines, sealing means for making water-tight the joint between said connecting pipes and water supply lines when they are telescoped together, and means for mechanically locking said housing and said connecting pipes together with said connecting pipes and water supply lines are in telescoped engagement, said locking means comprising a first pair of elongated ribs disposed substantially parallel with the connecting pipe axes and projecting from the housing one into contact*

*with each connecting pipe, a second pair of elongated ribs also disposed substantially parallel with the connecting pipe axes projecting from the housing one into contact with each connecting pipe at a position spaced circumferentially about the connecting pipes from said first ribs, the ribs of at least one of the pairs of ribs having a sharp edge in contact with each connecting pipe, and a locking screw threaded into the housing bearing against both of said connecting pipes at positions spaced circumferentially from said ribs and pressing each of said connecting pipes against one rib of each pair of said ribs.*

*4. The apparatus of claim 3 wherein each of said ribs makes substantial line contact with the adjacent connecting pipe.*

*5. The apparatus of claim 3 wherein said ribs of said first and second pair of ribs and said locking screw bearing portions are substantially equicircumferentially spaced about said connecting pipes.*

*6. The apparatus of claim 3 including a boss, said boss supported in said housing and having a bore for threaded receipt of said locking screw, said boss further forming one rib of said first and second pair of ribs.*

*7. The apparatus of claim 3 wherein the bearing portions of said locking screw define substantially point contacts with said connecting pipes.*

* * * * *